(12) United States Patent
Ito

(10) Patent No.: US 8,155,286 B2
(45) Date of Patent: Apr. 10, 2012

(54) COMMUNICATION APPARATUS

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1513 days.

(21) Appl. No.: 11/612,171

(22) Filed: Dec. 18, 2006

(65) Prior Publication Data

US 2007/0140445 A1    Jun. 21, 2007

(30) Foreign Application Priority Data

Dec. 16, 2005 (JP) .................................. 2005-362664

(51) Int. Cl.
*H04M 11/00* (2006.01)
(52) U.S. Cl. ............................... 379/93.17; 379/142.04
(58) Field of Classification Search ............... 379/93.17, 379/142.01, 142.04, 142.08, 93.28, 93.29, 379/93.31, 93.32
See application file for complete search history.

(56) References Cited

U.S. PATENT DOCUMENTS

| 5,321,722 | A | 6/1994 | Ogawa |
| 6,335,969 | B1 | 1/2002 | Yasuda |
| 6,347,136 | B1 | 2/2002 | Horan |
| 6,768,791 | B1 * | 7/2004 | Olafsson et al. ........... 379/93.32 |
| 6,912,276 | B1 * | 6/2005 | Olafsson et al. ........... 379/93.35 |

FOREIGN PATENT DOCUMENTS

| JP | S62-209945 A | 9/1987 |
| JP | S63-155293 A | 6/1988 |
| JP | H03-053731 A | 3/1991 |
| JP | H04-185034 A | 7/1992 |
| JP | H07-095341 A | 4/1995 |
| JP | H09-162956 A | 6/1997 |
| JP | H09-270870 A | 10/1997 |
| JP | H10-224587 A | 8/1998 |
| JP | H10-257198 A | 9/1998 |
| JP | 2000-151795 A | 5/2000 |
| JP | 2001-053842 A | 2/2001 |
| JP | 2003-348027 A | 12/2003 |
| JP | 2004-129121 A | 4/2004 |
| JP | 2005-295595 A | 10/2005 |
| JP | 2005-303760 A | 10/2005 |

OTHER PUBLICATIONS

Japanese Patent Office, Notification of Reasons for Refusal for Japanese Patent Application No. 2005-362664 dispatched Apr. 30, 2008 (counterpart to above-captioned patent application).
Japan Patent Office; Notification of Reason for Refusal in Japanese Patent Application No. 2005-362664 (counterpart to the above-captioned U.S. patent application) mailed Apr. 28, 2009.

* cited by examiner

*Primary Examiner* — Olisa Anwah
(74) *Attorney, Agent, or Firm* — Baker Botts L.L.P.

(57) ABSTRACT

A communication apparatus includes: a modem that modulates and demodulates a signal transmitted and received through a communication line; a caller information acquisition unit that acquires caller information for identifying a caller based on the signal output from the modem; a display device that displays the caller information; an instantaneous disconnection detection unit that detects an occurrence of an instantaneous disconnection while the communication line is connected; and a reconfiguration unit that reconfigures the modem when the instantaneous disconnection detection unit detects the instantaneous disconnection.

14 Claims, 9 Drawing Sheets

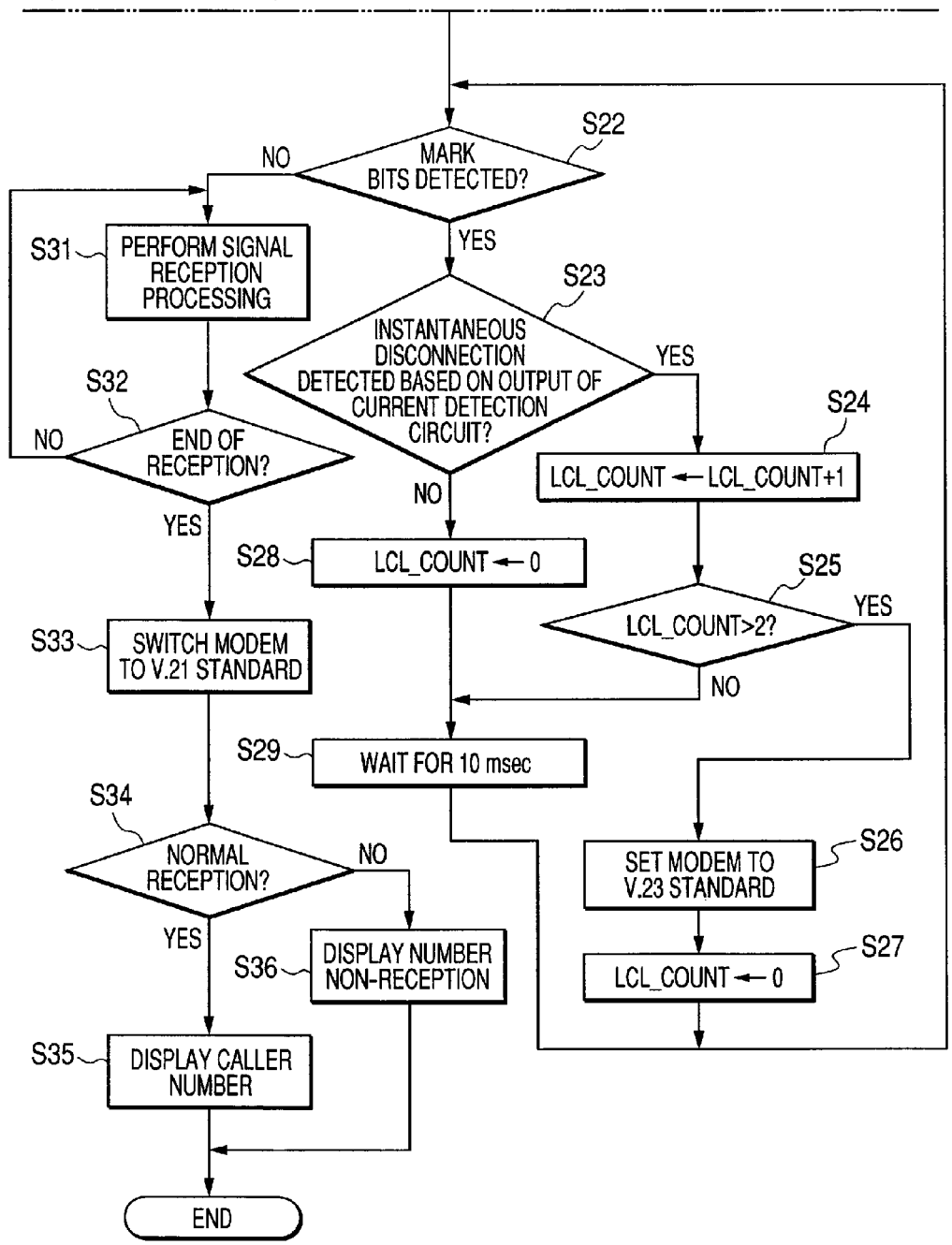

COMMUNICATION APPARATUS

CROSS-REFERENCE TO RELATED APPLICATION

This application claims priority from Japanese Patent Application No. 2005-362664, filed on Dec. 16, 2005, the entire subject matter of which is incorporated herein by reference.

TECHNICAL FIELD

Aspects of the present invention relate to a communication apparatus capable of displaying caller (originator) information that indicating a caller (originator) even when an instantaneous disconnection occurs on a communication line.

BACKGROUND

A telephone and a facsimile machine have a function called Caller ID service (which is also called "number display service") for displaying caller (originator) information when receiving an incoming call. The caller information may be a telephone number of the caller or a name of the caller. This function enables the recipient to know the caller before taking the call when a call comes in. Accordingly, the recipient can be prepared to answer the phone or to reject reception depending on the caller. If the recipient cannot answer the phone or a message is not left on the recipient's answering machine, the caller information is recorded and the recipient can call back the caller afterward by performing simple operation.

The Caller ID function is performed according to a communication procedure shown in FIG. 6. As shown in FIG. 6, if a caller originates a call, the polarity of the current flowing on the telephone line is inverted in a local exchange (simply, exchange), and after the expiration of a predetermined time of 0.1 seconds or more, an information reception terminal activation signal (simply a terminal activation signal, or CAR signal) is transmitted from the exchange to an information reception terminal (simply, terminal). The CAR signal is a 16-Hz signal transmitted intermittently every 0.5 seconds with a 0.5-second interval.

Upon reception of the CAR signal, the called terminal connects the telephone line to form a DC loop with the exchange and switches from communications based on V.21 standard to communications based on ITU-T Recommendation V.23 standard for receiving an FSK (Frequency Shift Keying) signal.

The exchange detects formation of the DC loop as a primary response signal and if the exchange receives a primary response signal from the terminal within 6 seconds after inversion of the polarity, the exchange transmits caller information by a signal conforming to the ITU-T Recommendation V.23 standard.

Upon completion of reception of the caller information from the exchange, the called terminal restores the communications to communications based on the V.21 standard and displays the caller information, such as the telephone number of the caller, on a display. At the same time, the called terminal disconnects the telephone line to disconnect the DC loop. If the exchange detects disconnection of the DC loop as a reception completion signal of the telephone number data, the exchange sends a general ringing signal.

The ringing signal is a 16-Hz signal transmitted intermittently every second with a 2-second interval. While transmitting the ringing signal, the exchange transmits a ring back tone (RBT) to the caller (originator).

If the called terminal is a telephone, the telephone rings in accordance with the ringing signal from the exchange and if the user lifts a handset of the telephone off the hook, the telephone line is connected back and a DC loop with the exchange is formed. If the exchange detects the DC loop as a secondary response signal, the exchange restores the inverted polarity of the telephone to a normal polarity to enable the communication.

There is also known a function called "call waiting" for displaying caller information of the caller when a new call comes in during a communication with another call. This function enables a user to know the caller information of the caller of the new call received during the communication with another call and enables the recipient to determine whether an urgent response to the new call is required.

The call waiting display service is performed according to a communication procedure shown in FIG. 7. As shown in FIG. 7, when an interrupter of a third party originates a call while a user is in communication with another communication party, the exchange sends an origination (calling) display tone to the terminal and also transmits a ring back tone (RBT) to the interrupter. The exchange transmits a DTMF (Dual Tone Multi Frequency) signal of an information reception terminal activation tone (simply, a terminal activation tone) in about 1 second after transmission of the origination (calling) display tone. The terminal activation tone is formed by a tone indicating "D" following "C." The exchange transmits caller information by an FSK (frequency modulation) signal conforming to the ITU-T Recommendation V.23 following the terminal activation tone.

Upon detection of the terminal activation tone, the terminal switches from communications based on the V.21 standard to communications based on the ITU-T Recommendation V.23 standard for receiving an FSK signal, receives the telephone number of the interrupter, and displays the telephone number on the display. Upon completion of reception of the telephone number, the terminal restores the communication to the communication based on the V.21 standard. While communication is set to the V.23 standard, the communication line becomes silent.

FIG. 8 shows the format of data transmitted by an FSK signal in the Caller ID or call waiting display service. As shown in FIG. 8, the data is formed at the top with consecutive mark bits of 1. The time period for the transmission of the mark bits is set to be 60 msec or more. Formed following the mark bits are a transparent mode control signal DLE added preceding a control signal, a control symbol (SOH) indicating the beginning of a header, a header indicating information sending from exchange to terminal, DLE, a control symbol STX indicating the start of text data, text data indicating the telephone number or caller name for conducting Caller ID, DLE, a control signal ETX indicating the end of the text data, and CRC (Cyclic Redundancy Check) for error correction. The text data includes information indicating service type, parameters, and parameter types.

A document JP-A-10-224587 discloses an apparatus for receiving a caller (originator) number notification and storing the caller (originator) number in a memory for displaying the caller (originator) number on a display.

SUMMARY

However, in the apparatus in the related art, if an instantaneous disconnection (short disconnection of 100 msec or less) occurs on a communication line, a modem enters a state in which the modem cannot normally receive the caller information.

Aspects of the invention provide a communication apparatus capable of displaying the caller information of a caller even when an instantaneous disconnection occurs on a communication line.

DESCRIPTION

Now, description will be given below of an aspect of the present invention while taking a communication apparatus as a first example.

Figure 1:
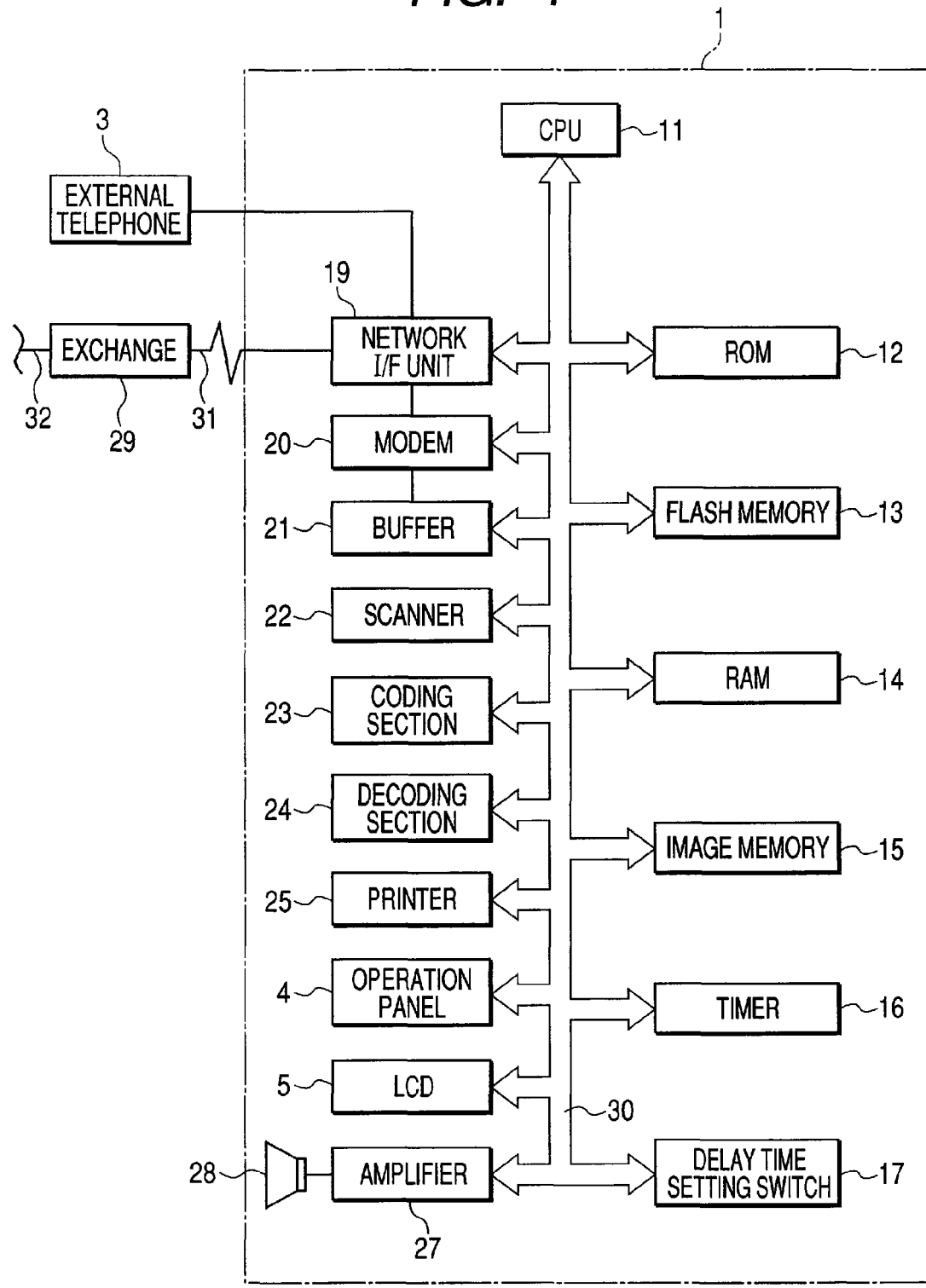
FIG. 1 is a block diagram showing an electric configuration of a communication apparatus according to a first embodiment of the present invention.

An electric configuration of a communication apparatus 1 according to the first example will be discussed with reference to FIG. 1. FIG. 1 is a block diagram showing the electric configuration of the communication apparatus 1. The communication apparatus 1 is a multiple function processing machine having multiple functions to serve as a facsimile machine and a copy machine. The communication apparatus 1 further includes telephone and facsimile functions, which includes Caller ID service and call waiting display service. The communication apparatus 1 is provided with a CPU 11, ROM 12, flash memory 13, RAM 14, image memory 15, a timer 16, a delay time setting switch 17, a network I/F unit 19, a modem 20, a buffer 21, a scanner unit 22, a coding unit 23, a decoding unit 24, a printer unit 25, an operation panel 4, an LCD 5, and an amplifier 27, which are connected to one another via a bus line 30.

The CPU 11 controls the units connected to the bus line 30 in accordance with various signals transmitted and received through the network I/F unit 19. The ROM 12 is unrewritable memory that stores various control programs and parameters, including software programs for performing processes shown in flowcharts in the accompanying drawings.

The RAM 14 is memory for temporarily storing various pieces of data when the CPU 11 executes the control program. To detect an instantaneous disconnection, a current value is detected every 10 msec and if three successive instantaneous disconnections are detected, the modem 20 is reconfigured. A count value LCL_COUNT for counting the number of times an instantaneous disconnection is detected is stored in the RAM 14.

The flash memory 13 is rewritable non-volatile memory and stores information such as user-configurable values.

The timer 16 counts the delay time. If the terminal activation signal for providing notification of transmission of the caller information is received, a response to the exchange is made (for Caller ID, the line is connected and the exchange is informed that the communication apparatus 1 is ready for receiving the caller information) and the modem 20 is set to a caller information reception mode in a predetermined delay time after the response is made.

The delay time setting switch 17 is a switch for setting the delay time and enables a service person to configure the delay time to any of 0.50 msec, 100 msec, 150 msec, or 200 msec. The delay time setting switch 17 is installed at a position different from the position where the operation panel 4 is disposed, allowing the delay time setting switch 17 to be mainly operated by a service person.

The image memory 15 is memory for storing image data. Received image data is stored in the image memory 15 and is printed on a sheet by the printer unit 25 and is erased from the image memory 15. Image data read by the scanner unit 22 is also stored in the image memory 15, and if a facsimile transmission function is set, the image data is transmitted by the network I/F unit 19. If the copy function is set, the image data is printed on a sheet by the printer unit 25.

Figure 2:
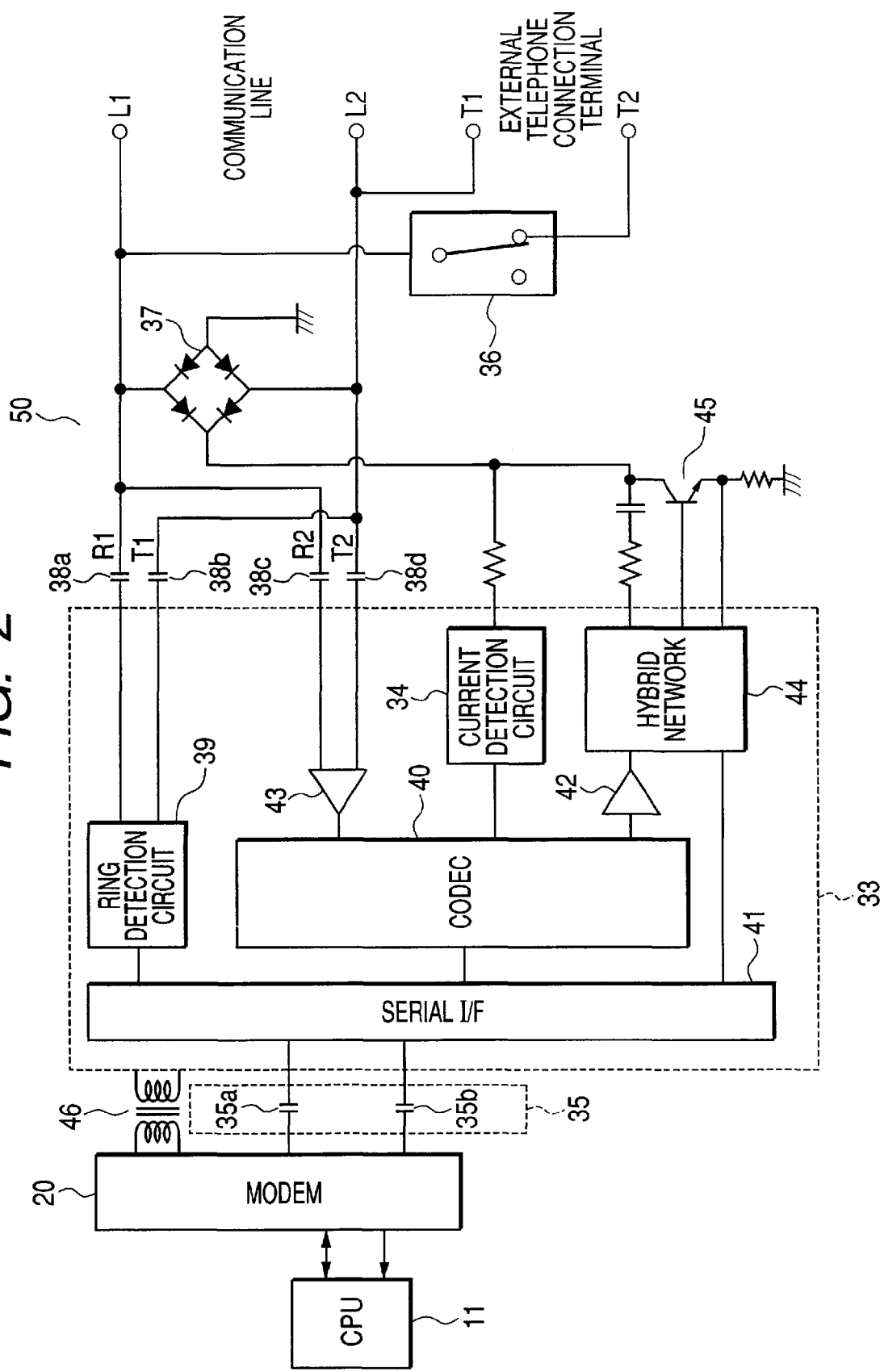
FIG. 2 is a block diagram showing the configuration of a network I/F unit.

The network I/F unit 19 performs line control and has semiconductor DAA 33 (data access arrangement) (see FIG. 2). The communication apparatus 1 is connected to a telephone line 31 through the network I/F unit 19. The network I/F unit 19 receives various signals sent from a exchange 29 such as a ringing signal and a signal indicating the telephone number of the opposite apparatus, and also transmits a dial signal at the calling time responsive to key operation on the operation panel 4 to the exchange 29. The network I/F unit 19 measures the current flowing into the line and if an instantaneous disconnection occurs, notification of the instantaneous disconnection is sent to the CPU 11 through the modem 20. An external telephone 3 is connected through an external telephone terminal T1, T2.

The modem 20 modulates and demodulates image information and communication data for transmission and also transmits and receives various protocol signals for transmission control. If the Caller ID function is set, the modem 20 sends a notification to the CPU 11 when a terminal activation signal (CAR signal) is received. Upon reception of the notification, the CPU 11 sets the modem 20 to a caller information signal reception mode (FSK reception mode) for receiving based on V.23 standard instead of V.21 standard being previously set. The terminal activation signal is a 16-Hz signal transmitted intermittently every 0.5 seconds with a 0.5-second interval.

If the call waiting display service is set, the modem 20 sends a notification to the CPU 11 when a call waiting signal is received. Upon reception of the notification, the CPU 11 sets the modem 20 to the caller information signal reception mode for receiving based on the V.23 standard. As the call waiting signal, a signal indicating "D" following "C" is transmitted at predetermined time intervals according to a DTMF (Dual Tone Multi Frequency) system. The exchange transmits the call waiting signal to the terminal and transmits caller information according to the V.23 standard to the terminal in a predetermined time.

Overseas, a notification of the telephone number or the name of the caller may be sent according to the DTMF system, and the modem 20 demodulates the tone signal received according to the DTMF system to a code representing digits or alphabetical letters and outputs the code to the CPU 11.

To receive an FSK signal, the modem 20 demodulates the FSK signal sent from the exchange to a digital signal and outputs the digital signal to the CPU 11. Upon completion of reception of the FSK signal, the CPU 11 sets the modem 20 so as to receive according to the V.21 standard.

The buffer 21 temporarily stores data containing coded image information transmitted and received to and from the opposite apparatus. The scanner unit 22 reads an image on a sheet that is fed into a sheet insertion slot or an image on a sheet placed on a platen glass. The coding unit 23 codes the image data read by the scanner unit 22. The decoding unit 24 reads and decodes the image data stored in the buffer 21 or the image memory 15, and the decoded data is printed on a sheet by the printer unit 25.

The printer unit 25 is implemented as an ink jet printer and prints an image on a sheet in accordance with the input image data. The amplifier 27 amplifies a ringing tone and an electric signal of voice, and drives a speaker 28 connected thereto.

The described communication apparatus 1 is connected to the telephone line 31 through the network I/F unit 19, and the telephone line 31 is connected to the exchange 29. The exchange 29 is connected to other exchanges through a telephone line 32. Each of the other exchanges is further connected to a different apparatus or a transmission destination through another telephone line.

Next, the network I/F unit 19 will be discussed with reference to FIG. 2. FIG. 2 is a block diagram showing the configuration of the network I/F unit 19. The network I/F unit 19 is provided with the semiconductor DAA 33, a CML (Connect MODEM to Line) relay 36 for switching telephone and facsimile, a rectification bridge 37, DC loop cut capacitors 38a, 38b, 38c, and 38d, a transistor 45, and an oscillation detection circuit 50. L1 and L2 denote terminals for the telephone line 31, and T1 and T2 denote terminals for connecting the external telephone 3.

The semiconductor DAA 33 and the modem 20 are connected each other via an insulation section 35 and a transformer 46. The insulation section 35 provides insulation of a direct current between the semiconductor DAA 33 and the modem 20, while providing transmission of data and signal between the semiconductor DAA 33 and the modem 20. The transformer 46 supplies power from the modem 20 to the semiconductor DAA 33.

The semiconductor DAA 33 includes a hybrid network 44, a CODEC 40, a ring detection circuit 39, a transmission amplifier 42, a toner amplifier 43, a serial I/F 41, and a current detection circuit 34.

The hybrid network 44 disconnects or connects the network and includes: a 2-line-4-line conversion circuit for separating facsimile data from the telephone line 31 into transmission and reception; a canceller circuit for suppressing routing of transmission data to the reception path; and a filter circuit. The hybrid network 44 is connected to the positive polarity of the rectification bridge 37 of the network through a capacitor and a resistor. The hybrid network 44 is connected to the CODEC 40 through the transmission amplifier 42. The hybrid network 44 is connected to a base of the transistor 45 and the serial I/F 41.

The CODEC 40 performs A/D conversion or D/A conversion of reception data and transmission data of the facsimile and is connected to the network and the external telephone through the toner amplifier 43. The COODEC 40 is also connected to the hybrid network 44 through the transmission amplifier 42.

The transmission amplifier 42 performs gain adjustment of transmission data. The toner amplifier 43 is a differential amplifier that is configured to have differential input relative to the terminals L1 and L2 of the telephone line 31.

When a tone signal comes into the CODEC 40 from the telephone line 31 or the external telephone 3, the tone signal is transmitted from the toner amplifier 43 to: the CODEC 40; the serial I/F 41; the insulation section 35; and the modem 20 in this order. And a tone detection signal output from the CODEC 40 is input to the CPU 11.

The ring detection circuit 39 is connected to the network and the external telephone 3 through the capacitors 38a and 38b and output of the ring detection circuit is connected to the serial I/F 41. When a ring signal comes in the ring detection circuit 39 from the telephone line 31, the ring detection circuit 39 detects the ring signal and outputs a ring detection signal to the serial I/F 41.

The serial I/F 41 converts the ring detection signal input from the ring detection circuit 39 and reception data of the facsimile input from the CODEC 40 into serial signals and transmits the serial signal to the modem 20 through the capacitor 35b. The control signal for connecting/disconnecting the telephone line 31 and the transmission data of the facsimile are input into the serial I/F 41 through the capacitor 35a from the modem 20. The serial I/F 41 outputs the control signal and the transmission data to the CODEC 40 and the hybrid network 44. The current detection circuit 34 is connected to the rectification bridge 37 through a resistor for detecting line current of the telephone line 31. The detected current value is converted into a digital value every 10 msec and the digital value is read by the CPU 11.

The transistor 45 adjusts the telephone line to meet the voltage current characteristics defined by the standard based on the line current detected by the current detection circuit 34. By controlling the base potential of the transistor 45, the impedance of the line is adjusted.

Figure 3:
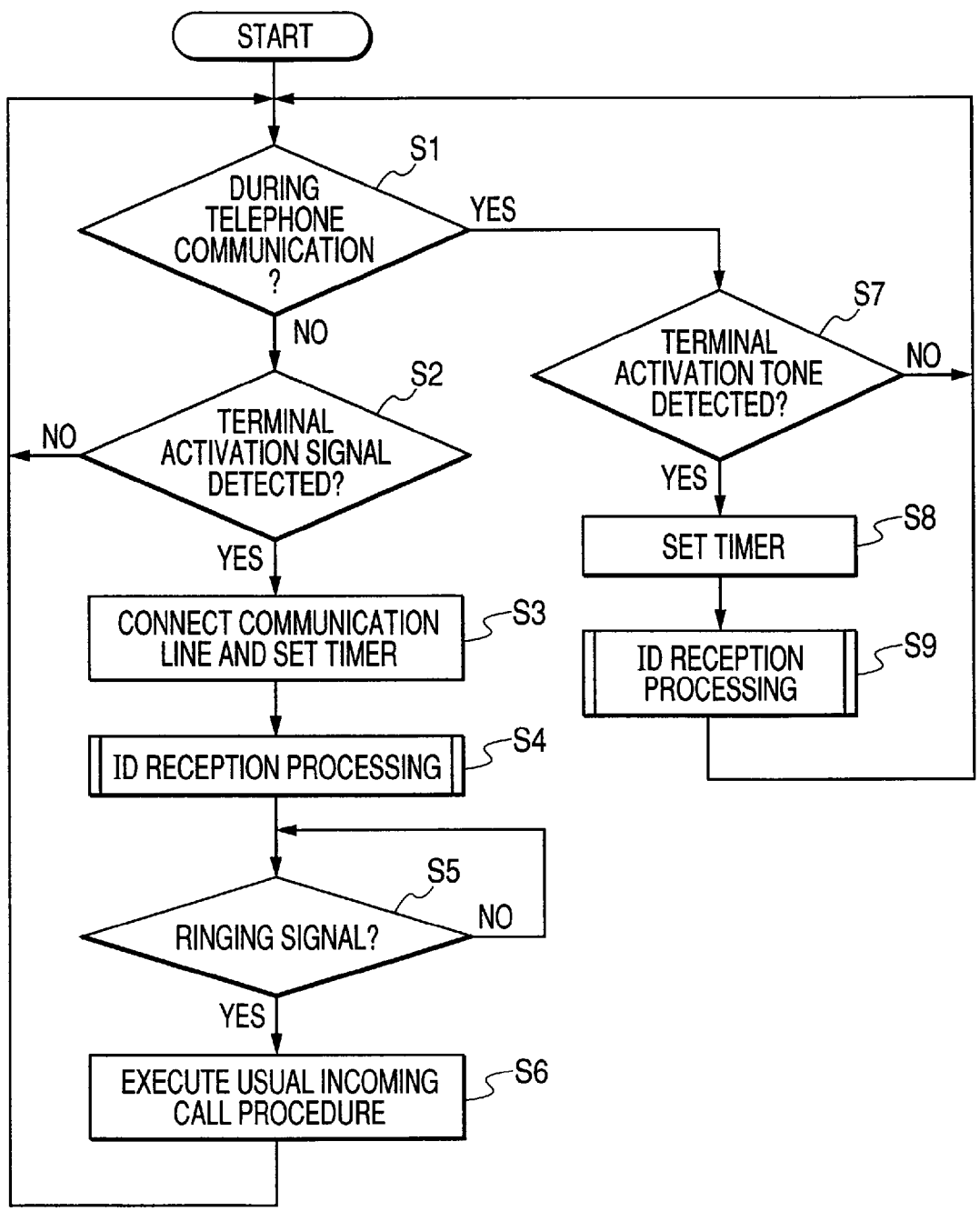
FIG. 3 is a flowchart showing reception processing.
Figure 4:
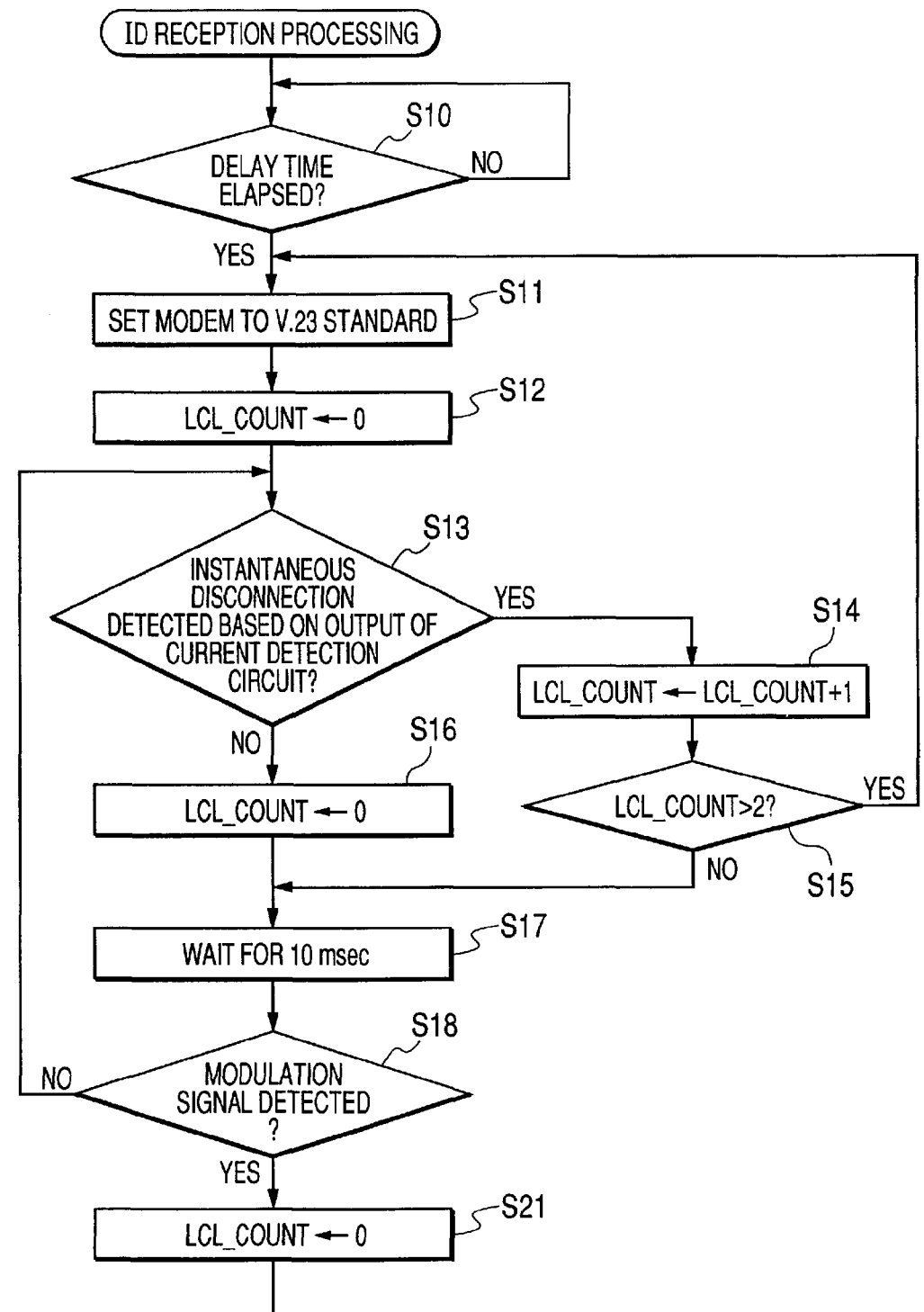
FIG. 4 is a flowchart showing ID reception processing.

In the follows, processing performed by the CPU 11 when the Caller ID service or call waiting display service is set in the described communication apparatus 1, will be described in detail with reference to FIGS. 3 and 4. FIG. 3 is a flowchart showing main processing performed by the CPU 11.

First, whether or not telephone communication is being held is determined (S1). If telephone communication is not being held (No at S1), whether or not a terminal activation signal is detected is determined (S2). If a terminal activation signal is detected (YES at S2), the line is connected and the timer 16 is set so as to count the delay time (S3). As the telephone line is connected, the exchange recognizes that the terminal receives the terminal activation signal, and then transmits transmitter information by FSK according to V.23 standard.

Next, ID reception processing is performed (S4). The ID reception processing is processing of receiving and displaying the telephone number of the name of the caller (originator). This processing is described later with reference to FIG. 4. If the telephone number of the caller is displayed by performing the ID reception processing, then whether or not a ringing signal is received is determined (S5). This ringing signal is a 16-Hz signal transmitted intermittently every second with a 2-second interval and differs from the terminal activation signal described above in origination pattern.

If a ringing signal is not received (No at S5), a standby mode is entered. If a ringing signal is received (YES at S5), a normal communication sequence is performed (S6). If a normal sequence is performed or if determined that the terminal activation signal is not detected at S2, the process returns to S1.

On the other hand, if it is determined at S1 that telephone communication is being held (YES at S1), whether or not a terminal activation tone of a notification of call waiting is detected is determined (S7). If a terminal activation tone is detected (YES at S7), the timer 16 is set so as to count the delay time (S8). Next, the same ID reception processing as at S4 is performed (S9). If the ID reception processing is performed or a terminal activation tone is not detected, the process returns to S1.

Next, the ID reception processing will be discussed with reference to FIG. 4. FIG. 4 is a flowchart showing the ID reception processing. In the ID reception processing, first, whether or not the timer 16 determines whether or not the delay time has elapsed (S10). The delay time is the time set through the delay time setting switch 17. When the delay time has not yet elapsed (No at S10), a wait mode is entered. When the delay time has elapsed (YES at S10), the modem 20 is switched from the V.21 standard to the caller information signal reception mode for receiving based on the V.23 standard (S1). Next, whether or not an instantaneous disconnection occurs on the line is determined (S1). The value of the line current detected in the network I/F unit 19 is polled every 10 msec and if an abnormal value has been detected three successive times, it is determined that an instantaneous disconnection has occurred.

The detail of determining the occurrence of the instantaneous disconnection will be described herein. First, the count value LCL_COUNT stored in the RAM 14 is set to "0" (S12). Next, whether or not an instantaneous disconnection is detected is determined based on output of the current detection circuit 34 (S13). If an instantaneous disconnection is detected (YES at S13), one is added to the count value LCL_COUNT (S14). Next, whether or not the count value LCL_COUNT is greater than 2 is determined (S15) and if the count value LCL_COUNT is greater than 2 (YES at S15), it means that an instantaneous disconnection has been detected three successive times and thus the process returns to S1 and the modem 20 is reconfigured to the caller information signal reception mode for receiving based on the V.23 standard. Accordingly, when a 30-msec or more instantaneous disconnection occurs, if the modem 20 enters a state in which it cannot normally receive caller information, the modem 20 can be restored to the normal state.

If it is not determined at S13 that an instantaneous disconnection is detected (No at S13), the count value LCL_COUNT is set to "0" (S16). If the processing at S16 is complete or if it is not determined at S15 that the count value LCL_COUNT is greater than 2 (No at S15), the process is made to wait for 10 msec (S17) and whether or not the modem 20 starts receiving FSK of a modulation signal is determined (S18).

If a modulation signal is not detected (No at S18), the process returns to S13. If a modulation signal is detected (YES at S18), the count value LCL_COUNT is set to 0 (S21) and whether or not the modulation signal is mark bits is determined (S22).

Next, whether or not an instantaneous disconnection is detected is determined based on output of the current detection circuit 34 (S23). If an instantaneous disconnection is detected (YES at S23), one is added to the count value LCL_COUNT (S24). Next, whether or not the count value LCL_COUNT is greater than 2 is determined (S25) and if the count value LCL_COUNT is greater than 2 (YES at S25), it means that an instantaneous disconnection has been detected three successive times and thus the modem 20 is reconfigured to the caller information signal reception mode for receiving based on the V.23 standard (S26). Accordingly, when a 30-msec or more instantaneous disconnection occurs, if the mode 20 enters a state in which it cannot normally receive caller information, the modem 20 can be restored to the normal state. After S26, the count value LCL_COUNT is set to 0 (S27) and the process returns to S22.

If it is not determined at S23 that an instantaneous disconnection is detected (No at S23), the count value LCL_COUNT is set to 0 (S28). If it is not determined at S25 that the count value LCL_COUNT is greater than 2 (No at S25) or if the processing at S28 is complete, the process is made to wait for 10 msec and then the process returns to S22.

If it is not determined at S22 that mark bits are being detected (No at S22), caller information is received starting at the data following the mark bits (S31) and whether or not the reception is complete is determined (S32). When a control symbol (ETX) indicating the end of text data in the reception data and CRC following the control symbol (ETX) are received, it is determined that the reception of the caller information is complete. If the reception of the caller information is not complete (No at S32), the reception is continued and when the reception of the caller information is complete (YES at S32), the modem 20 is set so as to conduct communications according to the V.21 standard (S33).

Next, whether or not the telephone number or the name of the caller, as the caller information, is normally received is determined (S34). If the telephone number or the name of the caller is normally received (YES at S34), the telephone number or the name of the caller is displayed on the LCD 5 (S35). On the other hand, if the telephone number or the name of the caller is not normally received (No at S34), a message such as "INCOMING CALL" is displayed on the LCD 5 (S36). If an instantaneous disconnection occurs during reception of the text data indicating the telephone number or the name of the caller, the telephone number or the name of the caller cannot be normally received. After display is produced on the LCD 5 at S35 or S36, the ID reception processing is terminated.

As described above, according to the first example, if an instantaneous disconnection is detected in the communication apparatus 1 having the Caller ID service or call waiting display service, the modem 20 is reconfigured, so that if the instantaneous disconnection causes the modem 20 to enter a state in which it cannot normally receive caller information, the modem 20 can be restored to the normal state and thus the telephone number or the name of the caller (originator) can be acquired accurately. Since the modem 20 is set to the recipient information signal reception mode in a predetermined delay time after a terminal activation signal for providing notification of caller information is received and a response to the signal is made, if an instantaneous disconnection occurs during the delay time, the later transmitted caller information can be received and displayed in a normal state.

Figure 5:
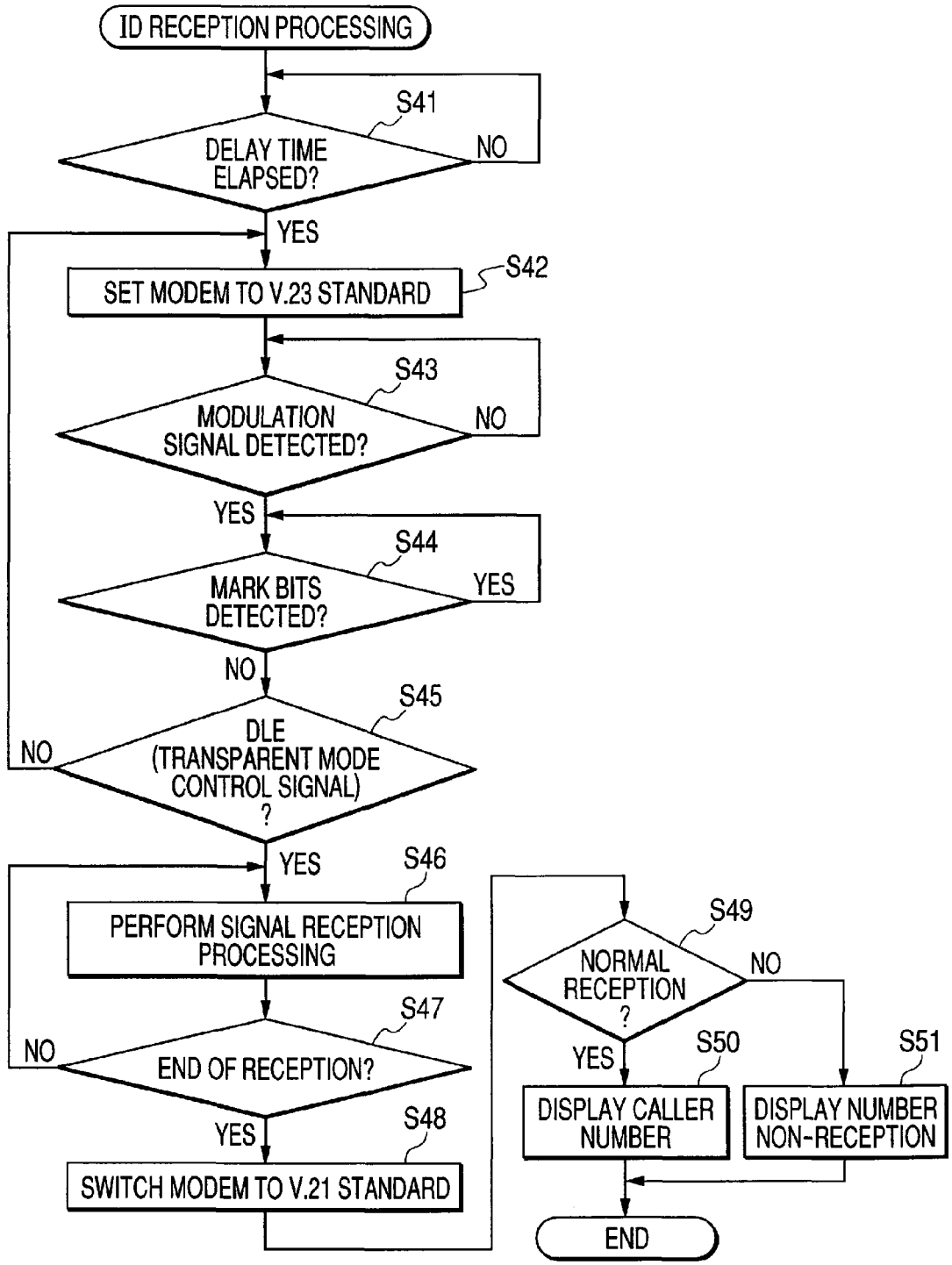
FIG. 5 is a flowchart showing ID reception processing according to a second embodiment of the present invention.
Figure 6:
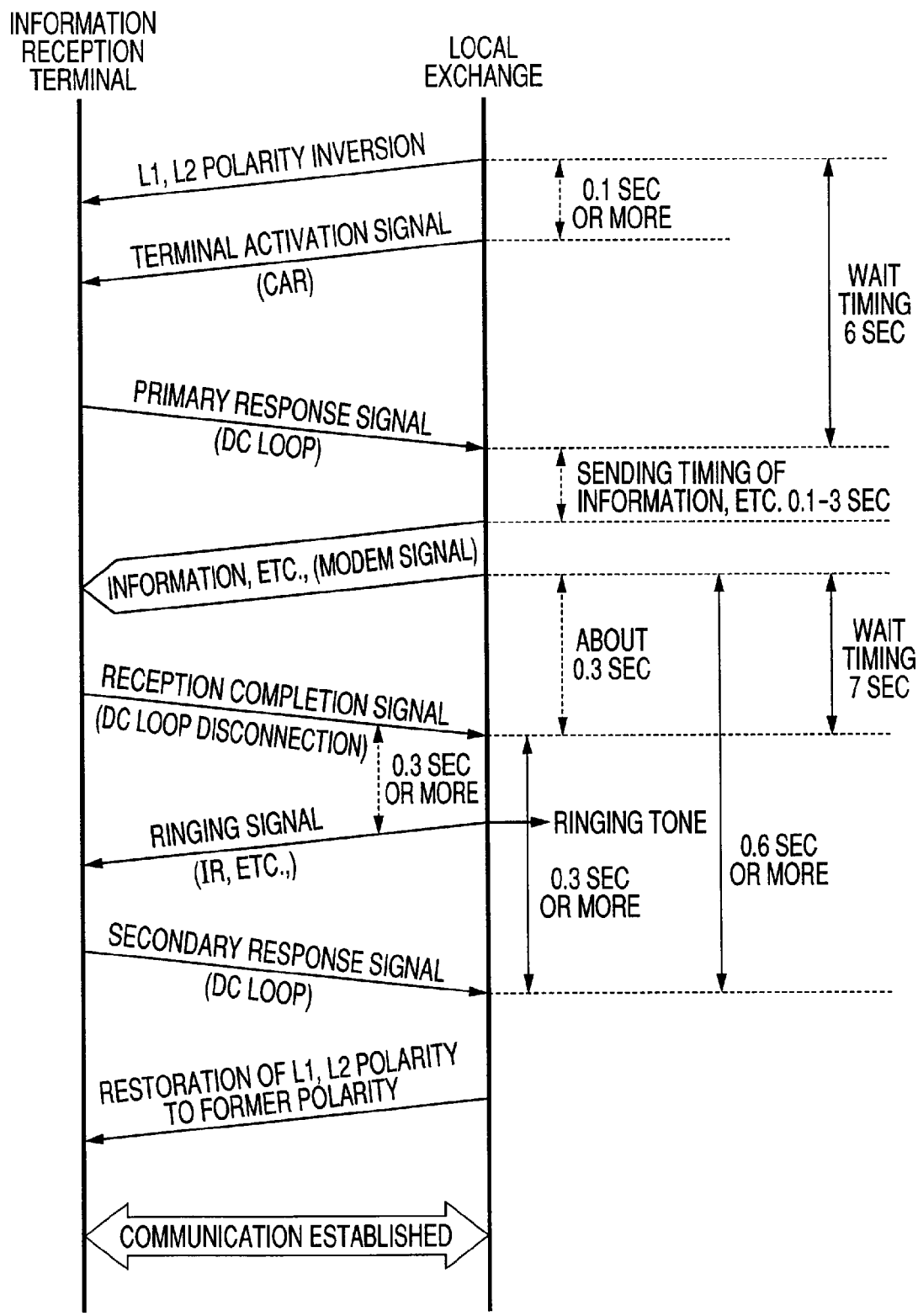
FIG. 6 is a schematic representation showing an incoming call procedure in Caller ID service.
Figure 7:
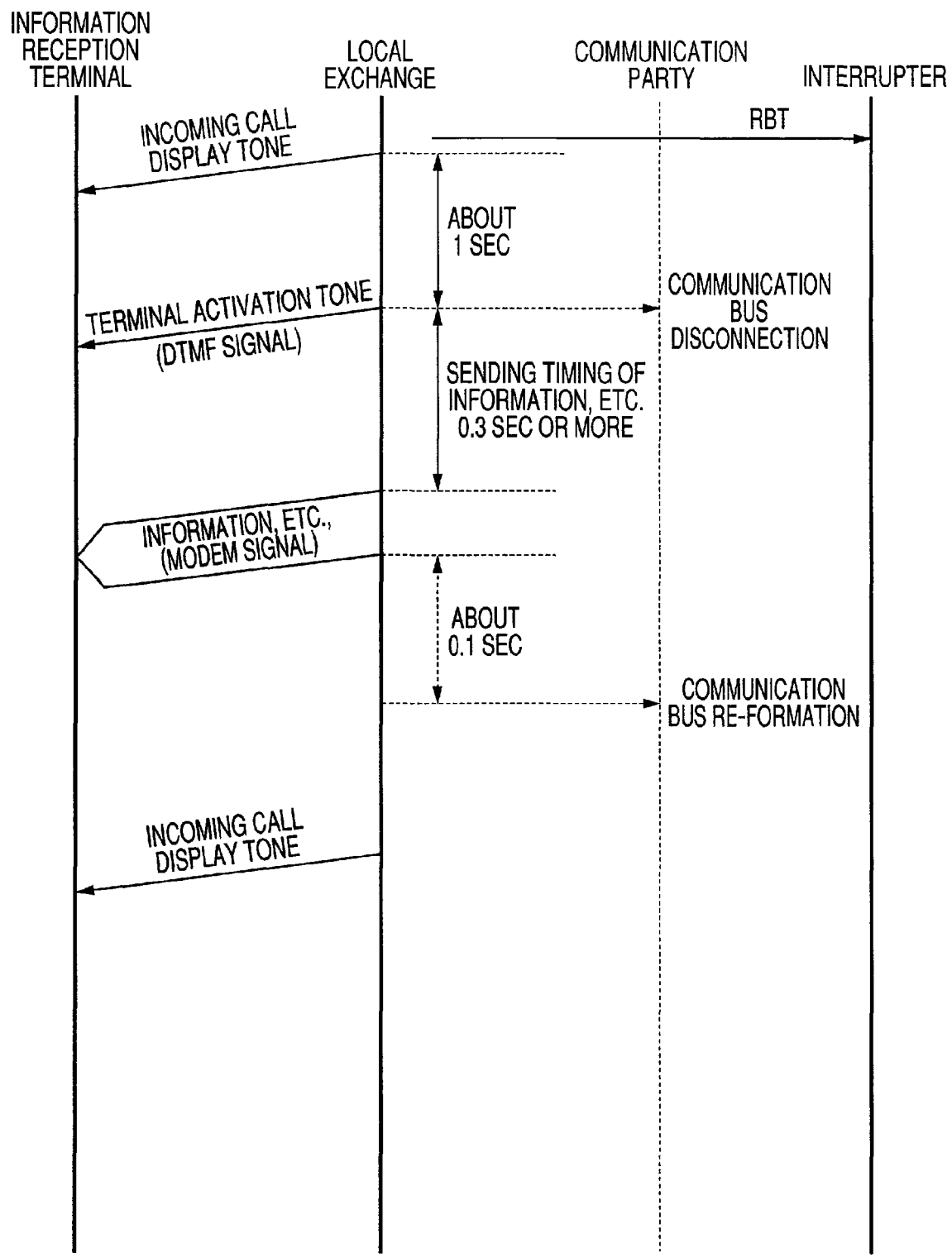
FIG. 7 is a schematic representation showing an incoming call procedure in call waiting display service.
Figure 8:
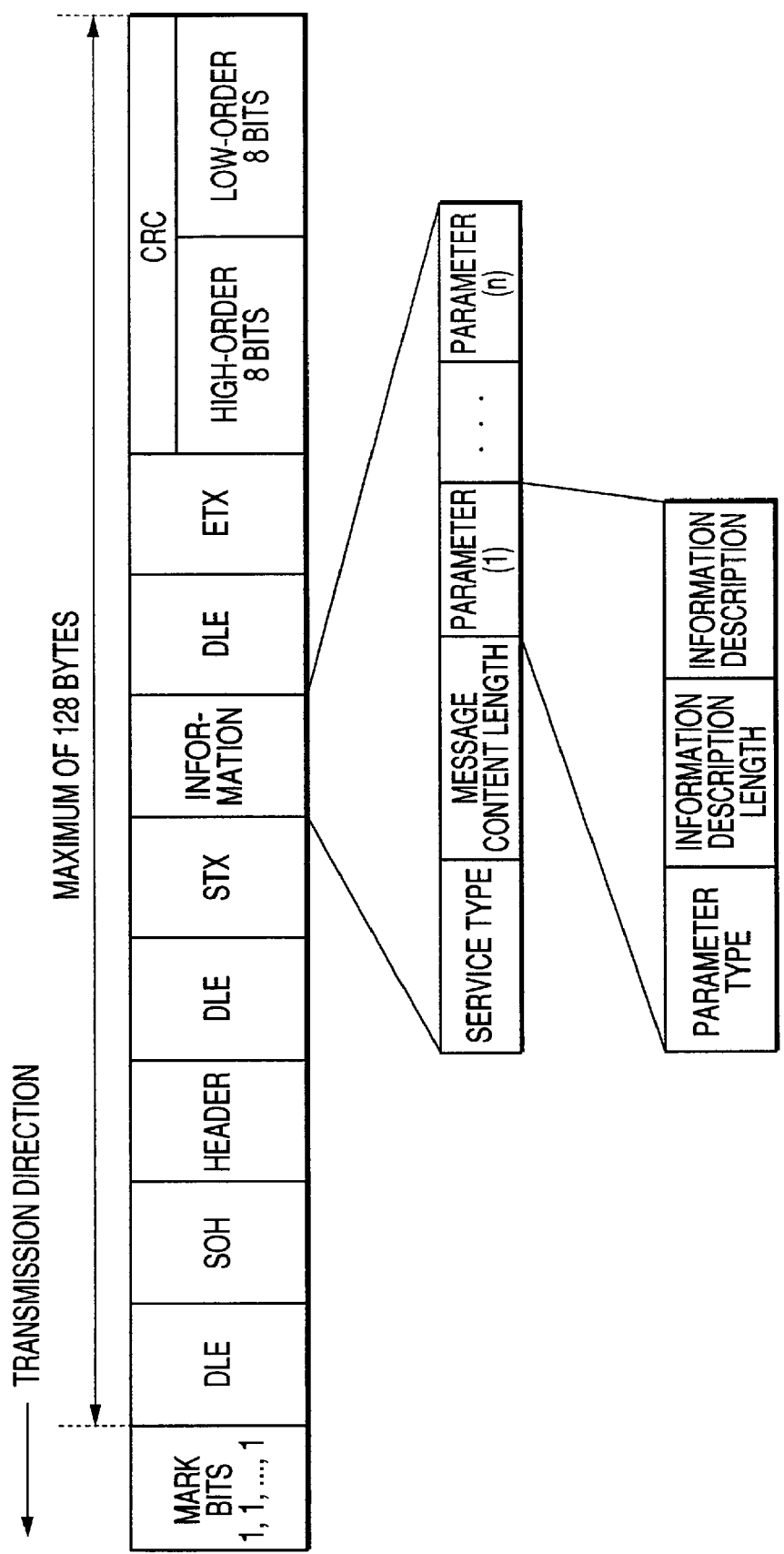
FIG. 8 is a drawing showing the data format of caller information.

Next, a second example of the present invention will be discussed with reference to FIG. 5. In the first example, the current detection circuit 34 is configured to detect an instantaneous disconnection and if the instantaneous disconnection continues for 30 msec or more, the modem 20 is reconfigured. In the second example, the communication apparatus 1 is configured to determine whether or not the demodulated digital value is normal after start of reception of a modulation signal of FSK, and if the digital value is not normal, a modem 20 is reconfigured. FIG. 5 is a flowchart showing ID reception processing according to the second example. The ID reception processing described below differs from the ID reception processing according to the first example that is previously described with reference to the flowchart of FIG. 4. The communication apparatus 1 according to the second example is the same as that according to the first example other than the ID reception processing.

As shown in FIG. 5, in the ID reception processing according to the second example, whether or not the count time of a timer 16 exceeds a predetermined delay time set at S3 or S8 is determined (S41). When the delay time has not yet elapsed (No at S41), a wait mode is entered. When the delay time has elapsed (YES at S41), the modem 20 is switched from the V.21 standard to the caller information signal reception mode for receiving based on the V.23 standard (S42).

Next, whether or not the modem 20 starts receiving FSK of a modulation signal is determined (S43). If the modulation signal is not detected (No at S43), a wait mode is entered. If the modulation signal is detected (YES at S43), whether or not the modulation signal is mark bits is determined (S44). Since the mark bits are consecutive "1" as described for the first example, if "0" is detected, it is determined that the modulation signal is not mark bits. If mark bits are detected (YES at S44), a wait mode is entered. If mark bits are not detected (No at S44), whether or not the signal is DLE (transparent mode control signal) is determined (S45)

If the signal is not DLE (No at S45), it is determined that an instantaneous disconnection causes the modem 20 to enter a state in which it cannot normally receive information, and the process returns to S42 and the modem 20 is reconfigured so as to receive according to the V.23 standard. Accordingly, the modem 20 can be restored to a state in which it can conduct normal communications.

If it is determined at S45 that DLE is detected (YES at S45), caller information is received starting at the data following the DLE (S46) and whether or not the reception is complete is determined (S47). When a control symbol (ETX) indicating the end of text data in the reception data and CRC following the control symbol (ETX) are received, it is determined that the reception of the caller information is complete. If the reception of the caller information is not complete (No at S47), the reception is continued and when the reception of the caller information is complete (YES at S47), the modem 20 is switched so as to conduct communications according to the V.21 standard (S48).

Next, whether or not the telephone number or the name of the caller (the caller information) is normally received is determined (S49). If the telephone number or the name of the caller is normally received (YES at S49), the telephone number or the name of the caller is displayed on an LCD 5 (S50). On the other hand, if the telephone number or the name of the caller is not normally received (No at S49), a message such as "INCOMING CALL" is displayed on the LCD 5 (S51). If an instantaneous disconnection occurs during reception of the text data indicating the telephone number or the name of the caller, the telephone number or the name of the caller cannot normally be received. After display is produced on the LCD 5 at S50 or S51, the ID reception processing is terminated.

As described above, when the modem 20 receives a modulation signal in the communication apparatus 1 having the Caller ID service or call waiting display service, whether or not the digital signal provided by demodulating the modulation signal is valid data is determined, whereby whether or not the modem 20 receives data normally is determined and if the modem 20 does not normally receive data, the modem 20 is reconfigured.

Therefore, if an instantaneous disconnection causes the modem 20 to enter a state in which it cannot normally receive caller information, the modem 20 can be restored to the normal state and thus the telephone number or the name of the caller can be acquired accurately.

In the above-described examples, configuration of the communication apparatus 1 concerning the process of S13 described with reference to FIG. 4 serves as an instantaneous disconnection detection unit. Configuration of the communication apparatus 1 concerning the process of S11 and S26 described with reference to FIG. 4 and the process of S42 described with reference to FIG. 5 serves as a reconfiguration unit. Configuration of the communication apparatus 1 concerning the process of S2 described with reference to FIG. 3 serves as a terminal activation signal detection unit. Configuration of the communication apparatus 1 concerning the process of S7 described with reference to FIG. 3 serves as a terminal activation tone detection unit. Configuration of the communication apparatus 1 concerning the process of S44 and S45 described with reference to FIG. 5 serves as a signal data detection unit.

Although the present invention has been described above based on the examples, it is to be understood that the present invention is not limited to the specific examples described herein, and modifications and changes may be made without departing from the spirit and scope of the present invention.

For example, in the examples described above, the communication apparatus 1 is a multiple function processing machine having multiple functions to be served as a telephone, a facsimile machine, and a copy machine, but may be a single-function communication apparatus to be used as any one of a facsimile machine, a copy machine, or a telephone.

The examples have been described based on the communication modes implemented in a telephone system available in Japan, but can also be applied to other telephone systems available in other countries.

In the first example described above, the delay time setting switch 17 for setting the delay time is implemented as a switch for enabling a service person to select a suitable configuration from among a plurality of preset delay times, but may be configured by a volume switch for enabling a service person to set a suitable configuration by an analog control of the volume switch.

In the first example described above, an instantaneous disconnection is detected by detecting line current. In the second example, whether or not the modem 20 normally receives is determined based on the signal provided by the modem 20. However, the communication apparatus 1 may be configured to reconfigure the modem 20 in either case of: when an instantaneous disconnection is detected by detecting line current; and when normal receipt by the modem 20 is determined based on the signal provided by the modem 20.

What is claimed is:

1. A communication apparatus comprising:
   a modem that modulates and demodulates a signal transmitted and received through a communication line;
   a caller information acquisition unit that acquires caller information for identifying a caller based on the signal output from the modem;
   a display device that displays the caller information;
   an instantaneous disconnection detection unit that detects an occurrence of an instantaneous disconnection while the communication line is connected, comprising:
   a detection circuit that detects a line current of the communication line; and
   a determination unit that determines whether or not the line current continues to flow for a predetermined time period or more; and
   a reconfiguration unit that reconfigures the modem when the instantaneous disconnection detection unit detects the instantaneous disconnection.

2. The apparatus according to claim 1, wherein the instantaneous disconnection detection unit comprises a signal data detection unit that detects whether or not the signal data demodulated by the modem is a predetermined value, and
   wherein the reconfiguration unit reconfigures the modem when the signal data detection unit detects that the signal data is not the predetermined value.

3. The apparatus according to claim 1, further comprising:
   a terminal activation signal detection unit that detects a terminal activation signal that notifies transmission of the caller information; and a setting unit that sets the modem to a mode for receiving the caller information when the terminal activation signal detection unit detects the terminal activation signal.

4. The apparatus according to claim 1, further comprising:
a terminal activation tone detection unit that detects a terminal activation tone that notifies transmission of the caller information of an incoming communication during another communication is being established; and
a setting unit that sets the modem to a mode for receiving the caller information when the terminal activation tone detection unit detects the terminal activation tone.

5. The apparatus according to claim 3, further comprising:
a primary response signal transmitting unit that transmits a primary response signal by connecting the communication line when the terminal activation signal detection unit detects the terminal activation signal; and
a first delay time counting unit that counts a first delay time from the instant at which the primary response is transmitted,
wherein the setting unit sets the modem to the mode for receiving the caller information when the first delay time counting unit finishes counting the first delay time.

6. The apparatus according to claim 5, further comprising a second delay time counting unit that counts a second delay time from the instant at which the terminal activation tone is detected,
wherein the setting unit sets the modem to the made for receiving the caller information when the second delay time counting unit finishes counting the second delay time.

7. The apparatus according to claim 5, further comprising a delay time setting unit that allows to set the first delay time to an arbitrary time period.

8. The apparatus according to claim 6, further comprising a delay time setting unit that allows to set the first delay time and the second delay time to an arbitrary time period, respectively.

9. A communication apparatus comprising:
a modem that modulates and demodulates a signal transmitted and received through a communication line;
a caller information acquisition unit that acquires caller information for identifying a caller based on the signal output from the modem;
a display device that displays the caller information;
a terminal activation signal detection unit that detects a terminal activation signal that notifies transmission of the caller information;
a primary response signal transmitting unit that transmits a primary response signal by connecting the communication line when the terminal activation signal detection unit detects the terminal activation signal;
a delay time counting unit that counts a first delay time from the instant at which the primary response is transmitted; and
a setting unit that sets the modem to a mode for receiving the caller information when the delay time counting unit finishes counting the first delay time.

10. The apparatus according to claim 9, further comprising a terminal activation tone detection unit that detects a terminal activation tone that notifies transmission of the caller information of an incoming communication during another communication is being established,
wherein the delay time counting unit counts second delay time from the instant at which the terminal activation tone is detected, and
wherein the setting unit sets the modem to the mode for receiving the caller information when the delay time counting unit finishes counting the second delay time.

11. The apparatus according to claim 9, further comprising a delay time setting unit that allows to set the first delay time to an arbitrary time period.

12. The apparatus according to claim 10, further comprising a delay time setting unit that allows to set the first delay time and the second delay time to an arbitrary time period, respectively.

13. A communication apparatus comprising:
a modem that modulates and demodulates a signal transmitted and received through a communication line;
a caller information acquisition unit that acquires caller information for identifying a caller based on the signal output from the modem;
a display device that displays the caller information;
a terminal activation tone detection unit that detects a terminal activation tone that notifies transmission of the caller information of an incoming communication during another communication is being established;
a delay time counting unit that counts a second delay time from the instant at which the terminal activation tone is detected; and
a setting unit that sets the modem to a mode for receiving the caller information when the delay time counting unit finishes counting the second delay time.

14. The apparatus according to claim 13, further comprising a delay time setting unit that allows to set the second delay time to an arbitrary time period.

* * * * *